United States Patent [19]

Suzuki

[11] Patent Number: 5,274,790
[45] Date of Patent: Dec. 28, 1993

[54] CACHE MEMORY APPARATUS HAVING A PLURALITY OF ACCESSIBILITY PORTS

[75] Inventor: Hiroaki Suzuki, Tokyo, Japan

[73] Assignee: NEC Corporation, Tokyo, Japan

[21] Appl. No.: 693,296

[22] Filed: Apr. 30, 1991

[30] Foreign Application Priority Data

Apr. 30, 1990 [JP] Japan .................................. 2-112638

[51] Int. Cl.⁵ .......................................... G06F 12/00
[52] U.S. Cl. ............................ 395/425; 364/DIG. 1; 364/243.41; 364/243.6
[58] Field of Search ........................... 395/400, 425

[56] References Cited

U.S. PATENT DOCUMENTS 4,392,200  7/1983  Arulpragasam et al. ......... 395/425
4,768,148  8/1988  Keeley et al. .................. 395/425

FOREIGN PATENT DOCUMENTS 214718   3/1987  European Pat. Off. .
340668  11/1989  European Pat. Off. .
2075731 11/1981  United Kingdom .

OTHER PUBLICATIONS

"IBM Technical Disclosure Bulletin"; vol. 27, No. 9 (Feb. 1985).

Primary Examiner—David L. Robertson
Attorney, Agent, or Firm—WHitham & Marfhoefer

[57] ABSTRACT

A cache memory apparatus to be coupled to a main memory, comprises a cache memory having a plurality of ports and capable of being independently accessed through the plurality of ports. The cache memory stores a portion of data stored in the main memory and tag information indicating memory locations within the main memory of the data portion stored in the cache memory. A hit discriminator receives first tag information included in an address given when the cache memory is accessed and second tag information read from the cache memory in accordance with the given address, in order to discriminate a cache-hitting and a cache-missing on the basis of the first and second tag information. A replacement control circuit operates for replacing data and corresponding tag information in the cache memory when the cache-missing is discriminated by the hit discriminating circuit. A replacement limiting circuit operates for limiting the replacement of the cache memory to one time when a plurality of accesses to the same address are generated and all the plurality of accesses to the same address are missed.

8 Claims, 3 Drawing Sheets

CACHE MEMORY APPARATUS HAVING A PLURALITY OF ACCESSIBILITY PORTS

BACKGROUND OF THE INVENTION

1. Field of the Invention

The present invention relates to a cache memory apparatus provided between a CPU (central processing unit) and a main memory in order to realize a high speed access, and more specifically to such a cache memory having a plurality of accessible ports.

2. Description of Related Art

In computer systems, a cache memory has been conventionally used as a means for speeding up access to a main memory. The cache memory system is based on a localization in space and in time in program access and data access operations. Once certain data in the main memory is accessed, the data is reserved in a cache memory which can be accessed at a speed higher than that of accessing the main memory, so that at a second and succeeding accesses to the same data, access is made to the cache memory, not the main memory, so that a required access time is shortened.

In a high speed system having a plurality of CPUs (central processing units), the most general method is to provide one cache memory to each of the CPUs. In this case, however, a complicated protocol has been necessary to ensure coincidence between the main memory and the respective cache memories, and therefore, the amount of hardware has been inevitably increased.

Therefore, a relatively small number of CPU systems have been constructed so that the cache memory is configured to be of a multi-port type, and a plurality of CPUs are coupled in common to the single cache memory. In this case, since the plurality of CPUs access to the common cache memory at random, a plurality of accesses often conflict with each other. Therefore, the accesses are allowed one by one in the order of accesses or in the order of priorities assigned to the CPUs.

For example, as shown in FIG. 1, first and second CPUs 1, 2 are coupled through a single 2-port cache memory apparatus 3 and a system bus 4 to a main memory 5. The cache memory includes a 2-port cache memory 6, a first controller 7 for controlling the 2-port cache memory on the basis of an access from the first CPU, and a controller 8 for controlling the 2-port cache memory on the basis of an access from the second CPU.

In this cache memory apparatus, since the cache memory is of the 2-port type, the first and second controllers can operate independently of each other unless access conflict occurs in a line to be accessed.

However, the above mentioned conventional cache memory has been disadvantageous in the following points:

For example, when a certain cache access (called an access "A") has become a miss and replacement will be performed, if another access (called an access "B") simultaneously occurs to access the same data, the access B will become missing, since the replacement for the access "A" has not yet been completed and therefore since the cache has not yet been updated. Therefore, replacement for the access "B" will be performed. However, since the data newly located in the cache by the replacement for the access "B" is the same as the data located by the replacement for the access "A", the data newly located in the cache by the replacement for the access "B" is redundant.

In addition, when the access "A" for a line is hit (i.e., is found or is acceptable) but before the access history information (LRU, FIFO, etc) corresponding to the hit line is updated, if the access B is made to the same line and is missed (i.e., not found or unacceptable), there is a possibility that the same block as that selected by the access "A" is replaced. In this case, the data hit in the access "A" is overwritten.

Furthermore, when both of the accesses A and B which access the same line but which designate different regions within the main memory are missed (i.e., not found), if replacement is performed before the access history information of the line in question is a updated, there will be possibility that the same block is selected and that data will be overwritten in the same block.

SUMMARY OF THE INVENTION

Accordingly, it is an object of the present invention to provide a cache memory apparatus which has overcome the above mentioned defect of the conventional one.

Another object of the present invention is to provide a cache memory apparatus capable of preventing a fruitless or unstable replacement when a plurality of accesses to the same cache memory conflict with each other, so as to elevate a high speed operation which is an advantage inherent to the cache memory.

The above and other objects of the present invention are achieved in accordance with the present invention by a cache memory apparatus to be coupled to a main memory, comprising:

a memory device having a plurality of ports and capable of being independently accessed through the plurality of ports, the memory device storing a portion of data stored in the main memory and tag information indicating memory locations within the main memory of the data portion stored in the memory device;

a hit discriminating means receiving first tag information included in an address given when the memory device is accessed and second tag information read from the memory device in accordance with the given address, the hit discriminating means operating to discriminate a cache-hitting and a cache-missing on the basis of the first and second tag information;

a replacement control means for replacing data and corresponding tag information in the memory device when the cache-missing is discriminated by the hit discriminating means, and a replacement limiting means for limiting the replacement of the memory device to one time when a plurality of accesses to the same address are generated and all the plurality of accesses to the same address are missed.

In a preferred embodiment, the cache memory apparatus further includes an access history information storing means for storing a history of accesses to the memory device, and the replacement control means operates to select and replace one set of data and corresponding tag information in the memory device on the basis of the access history information when the cache-missing is discriminated by the hit discriminating means. The replacement control means also operates in such a manner that when a plurality of accesses having different tag information having main memory addresses conflict with each other and at least one of the plurality of accesses has a cache-miss status updating of the access history information is controlled by the replacement control means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
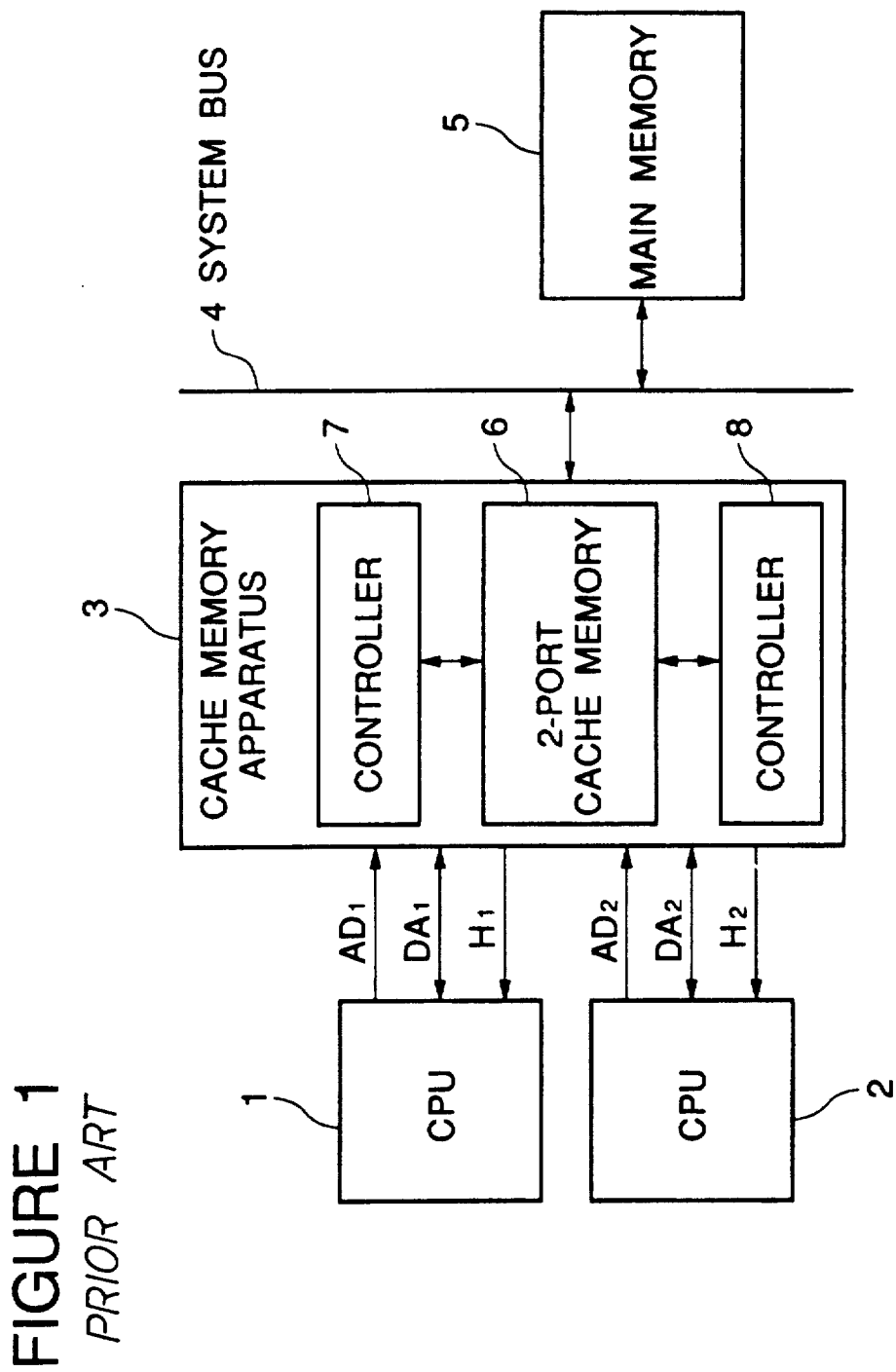
FIG. 1 is a block diagram of a computer system incorporating therein a multi-port cache memory apparatus.

Referring to FIG. 1, there is shown a diagram of a computer system incorporating therein a multi-port cache memory apparatus.

CPUs 1 and 2 are coupled through a 2-port cache memory apparatus 3 and a system bus 4 to a main memory 5. The cache memory 3 includes a 2-port cache memory 6, a controller 7 for controlling the 2-port cache memory 6 on the basis of an access from the CPU 1, and a controller 8 for controlling the 2-port cache memory 6 on the basis of an access from the CPU 2.

Figure 2:
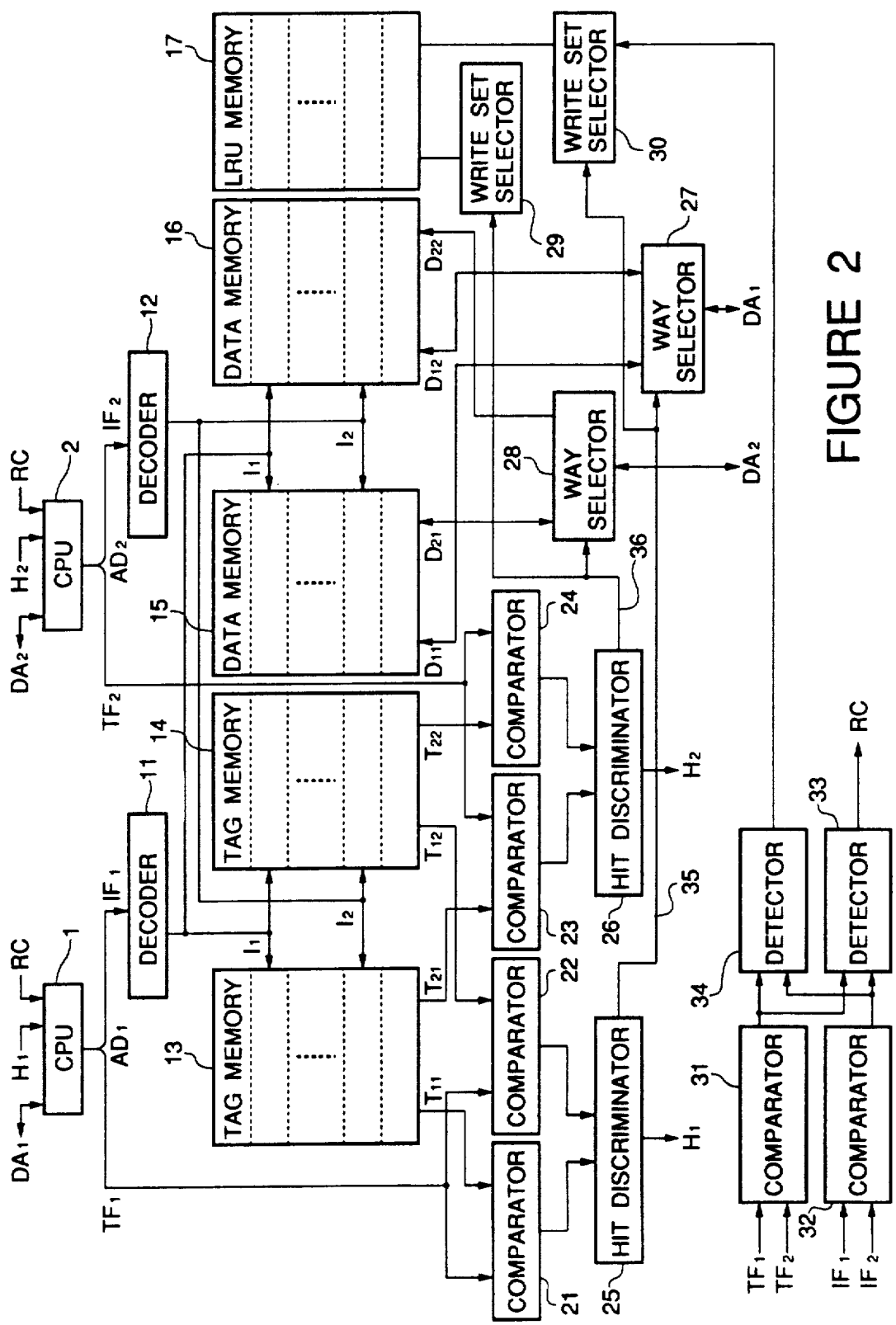
FIG. 2 is a block diagram of a first embodiment of the cache memory apparatus in accordance with the present invention.

Referring to FIG. 2, there is shown one embodiment of the 2-port cache memory 6 in accordance with the present invention. In the shown example, the cache memory is of the 2-way associative system and is based on an LRU replacement algorithm.

The 2-way associative system includes two sets of memories each of which includes a tag memory and a data memory. In the shown embodiment, a tag memory 13 and a data memory 15 constitute one memory set, and a tag memory 14 and a data memory 16 constitute another memory set. Each of the memories 13 to 16 has two input ports and two output ports, independently of each other.

An address $AD_1$ or $AD_2$ supplied from the CPU 1 or 2 is composed of a tag field $TF_1$ or $TF_2$ to be used for a tag comparison in the corresponding cache memory, and an index field $IF_1$ or $IF_2$ used for line selection. The index fields $IF_1$ and $IF_2$ are decoded by decoders 11 and 12, respectively, which generate line selection signals $l_1$ and $l_2$, respectively, which are supplied to the tag memories 13 and 14 and the data memories 15 and 16, respectively.

On the other hand, the tag field $TF_1$ is supplied to comparators 21 and 22, which also receive tag information $T_{11}$ and $T_{12}$ outputted from first outputs of the tag memories 13 and 14, respectively, so that the tag field $TF_1$ is compared with two items of tag information $T_{11}$ and $T_{12}$, respectively. Outputs of the comparators 21 and 22 are connected to a hit discriminator 25, which operates to discriminate a cache hit/miss so as to generate a hit signal $H_1$ indicative of the result of the discrimination to the CPU 1.

In addition, the tag field $TF_2$ is supplied to comparators 23 and 24, which also receive tag information $T_{21}$ and $T_{22}$ outputted from second outputs of the tag memories 13 and 14, respectively, so that the tag field $TF_2$ is compared with two items of tag information $T_{21}$ and $T_{22}$, respectively. Outputs of the comparators 23 and 24 are connected to a hit discriminator 26, which operates to discriminate a cache hit/miss so as to generate a hit signal $H_2$ indicative of the result of the discrimination to the CPU 2.

The hit discriminators 25 and 26 supply selection signals 35 and 36 to way selectors 27 and 28, respectively. The selection signal 35 indicates which of the comparators 21 and 22 generates a consistency signal, so that the way selector 27 selects either a data output $D_{11}$ of the data memory 15 or a data output $D_{12}$ of the data memory 16, which corresponds to the comparator (21 or 22) generating the active consistency signal. Similarly, the selection signal 36 indicates which of the comparators 23 and 24 generates a consistency signal, so that the way selector 28 selects either a data output $D_{21}$ of the data memory 15 or a data output $D_{22}$ of the data memory 16, which corresponds to the comparator (23 or 24) generating the active consistency signal. Thus, through the intermediary of the way selectors 27 and 28, data DA1 and DA2 are read/written between the data memories 15 and 16 and the external CPUs 1 and 2, respectively.

An LRU memory 17 is provided to store an access history information (called a "LRU bit" hereinafter) in correspondence to memory locations of each of the tag memories 13 and 14 and the data memories 15 and 16. The LRU bit constitutes a replacement set information used for determining which of the data sets is replaced when a cache missing occurs. This LRU bit is sequentially updated by write set selectors 29 and 30 controlled by the outputs of the hit discriminators 25 and 26.

The shown first embodiment further includes a comparator 31 for comparing the tag fields $TF_1$ and $TF_2$, a comparator 32 for comparing the index fields $IF_1$ and $IF_2$, a detector 33 for detecting that both outputs of the comparators 31 and 32 are "true", and a detector 34 for detecting that the outputs of the comparators 31 and 32 are "true" and "false", respectively. An output of the detector 33 is supplied to the controllers 7 and 8 as a replacement control signal RC. In addition, an output of the detector 34 is connected to the write set selector 30 for controlling the updating of the LRU bits.

Now, the process of the read access to the shown cache memory apparatus by the CPUs will be explained.

The address $AD_1$ given by the CPU 1 is divided into the tag field $TF_1$ used for tag comparison in the inside of the cache memory apparatus and the index field $IF_1$ for the line selection. By using the index field $IF_1$, the access is made to a designated line of the tag memory 13 or 14 and the data memory 15 or 16 of each memory set, so that data $T_{11}$ and $T_{12}$ in the tag memories 13 and 14 and data $D_{11}$ and $D_{12}$ in the data memories 15 and 16 are read out.

Next, the tag field TF1 is compared with the tag information $T_{11}$ and $T_{12}$ by the comparators 21 and 22, respectively, and the discriminator 25 generates a hit signal $H_1$ indicative of whether the access is hit or not. If either the tag memory 13 or 14 is hit, one of data $D_{11}$ and $D_{12}$ outputted from the data memories 15 and 16 corresponding to the hit tag memory is externally outputted and a hit is notified to the CPU 1. In addition, the LRU on the hit line is updated.

If both of the tag memories 13 and 14 are missed, a set of data which had been accessed at the oldest occurrence is flashed (or erased) in accordance with the LRU bits, and is replaced with a new set of data from the main memory 5. When the replacement has been completed, the completion of the replacement is notified to the CPU 1, and the corresponding LRU bit is updated. The above mentioned sequence of operation is controlled by the controller 7, and is well known to persons in the art. Therefore, a detailed description thereof will be omitted.

Access from the CPU 2 is performed similarly, but the sequence of operation is controlled by the controller 8. Therefore, when the CPUs 1 and 2 access different addresses, the above mentioned sequence of operation will be performed.

In the above mentioned cache memory apparatus, accordingly, since the tag memory and the data memory are of the 2-port memory type, the controllers 7 and 8 can operate independently of each other unless access conflict occurs in a line to be accessed.

When the CPUs 1 and 2 substantially simultaneously access the same address, and these accesses are missed, the apparatus operates as follows:

In this case, the tag fields $TF_1$ and $TF_2$ are the same value and the index fields $IF_1$ and $IF_2$ are the same value. Therefore, both the outputs of the comparators 31 and 32 become "true", and the replacement control signal RC is outputted from the detector 33 to the controllers 7 and 8. In this situation, assuming that the access by the CPU 1 is slightly prior to the access by the CPU 2, when the replacement by only the controller 7 is completed, the completion of the replacement is simultaneously notified to both the CPUs 1 and 2. In this case, therefore, the replacement by the controller 8 is not performed. In other words, the replacement is limited to one time, and therefore, a redundant replacement processing can be prevented so that a penalty time can be reduced.

When the CPUs 1 and 2 substantially simultaneously access addresses having different tag fields and the same index field, and when access by the CPU 1 is hit, the output of the detector 34 is rendered active (i.e., rendered "ON"), so that the write set selector 30 is notified of such a condition and the LRU bits are masked. Since a set of information selected by the hit discriminator 25 is notified to the write set selector 30, a replacement set for the access by the CPU 2 is forcibly changed so as not to overlap or overwrite a data selected in the access by the CPU 1.

Accordingly, when items of data on different regions in the main memory is attempted to be replaced on the same line of the cache memory, the items of data are actually located on different sets.

At this time, when both of the hit signals $H_1$ and $H_2$ indicate the missing, after respective replacements for the accesses of the CPUs 1 and 2 are completed, the respective items of data are transferred to the CPUs 1 and 2, respectively. In addition, when the hit signal $H_1$ indicates the hitting and the hit signal $H_2$ indicates the missing, the CPU 1 operates without interrupt, and the CPU 2 restarts the operation after the replacement has been completed.

Figure 3:
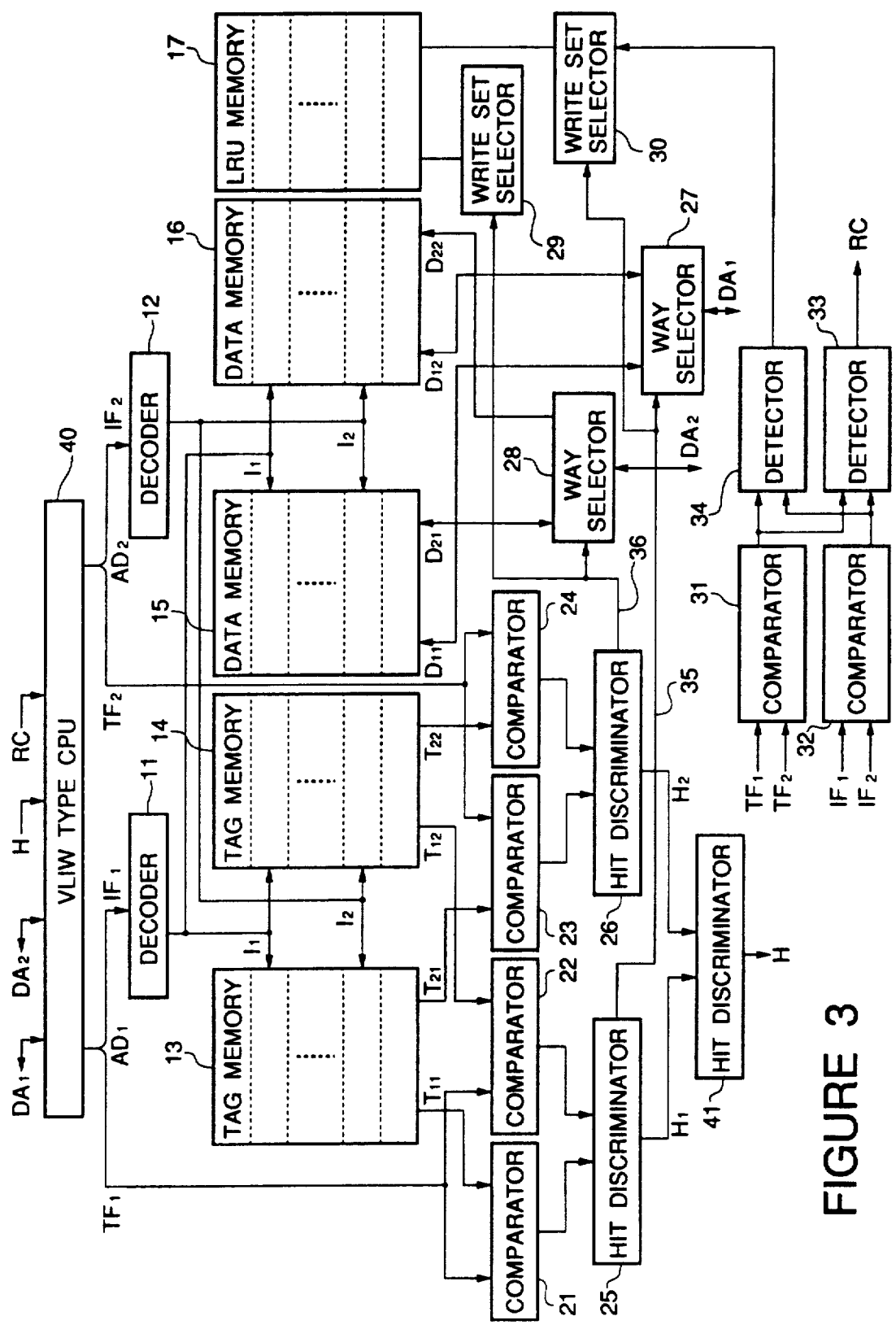
FIG. 3 is a block diagram of a second embodiment of the cache memory apparatus in accordance with the present invention.

Referring to FIG. 3, there is shown a block diagram of a second embodiment of the cache memory apparatus in accordance with the present invention. In the second embodiment, the present invention is applied to a system incorporating a CPU 40 of the VLIW (very long instruction word) type executing a plurality of accesses in synchronism.

Namely, the VLIW type CPU 40 is such that one instruction word length is divided into a plurality of fields, which are allocated to a plurality of resources such as an arithmetic logic unit and others, so that the contents of the respective fields are executed in parallel. Therefore, unless all items of data required for each one instruction word are collected or completed, the execution cannot be continued.

As seen from comparison between FIGS. 2 and 3, in addition to the elements included in the first embodiment, the second embodiment also includes a hit discriminator 41 for generating a logical product of the outputs $H_1$ and $H_2$ of the two hit discriminators 25 and 26. An output of the hit discriminator 41 is supplied to the CPU 40.

In the second embodiment, if at least one of a plurality of accesses is missed, the CPU 40 stops its operation, and restarts the operation after all necessary data is completed or collected.

For example, if different data is replaced in the same block, correct data can be transferred, without using the present invention, in such a manner that when a plurality of asynchronous CPUs are coupled to the cache memory, a replaced data is transferred to a corresponding CPU at each replacement time.

However, in the second embodiment in which the cache memory is coupled to the VLIW type CPU 40, when the CPU restarts the operation, previously replaced data will disappear, and correct data cannot be transferred. Therefore, the present invention is indispensable when the VLIW type CPU is coupled to a cache memory and erroneous data transfer can be positively prevented with the second embodiment of the invention as compared to the conventional system described above.

The above mentioned embodiments are of 2-port and 2-way set associative system. However, it would be apparent that the present invention can be applied to a cache memory of a 3-port and 3-way set type or a set having four or more ports and four or more ways.

As seen from the description of the embodiment with reference to the accompanying drawings, the cache memory apparatus in accordance with the present invention is characterized in that when a plurality of accesses to the same address conflicts and all the plurality of accesses are missed, the replacement of the cache memory is limited to one time, and therefore, a redundant replacement processing can be prevented so that the operation speed can be elevated.

In addition, when a plurality of accesses having addresses of different tag information conflict with each other and at least one of these accesses is missed, the updating of the access history information is controlled. Therefore, when one cache access is hit, even if another cache access is missed before an access history information corresponding to the hit access is updated, since the access history information is properly controlled, it is possible to prevent an inconvenient situation in which unstable replacement of data occurs.

The invention has thus been shown and described with reference to the specific embodiments. However, it should be noted that the present invention is in no way limited to the details of the illustrated structures but changes and modifications may be made within the scope of the appended claims.

I claim:

1. A cache memory apparatus to be coupled to a main memory and for being accessed by an external device, said cache memory apparatus comprising:

a memory device having a plurality of ports and means for being independently accessed through said plurality of ports by said external device, said memory device storing a portion of data stored in said main memory and corresponding tag information indicating memory locations within said main memory of said data portion stored in said memory device;

hit discriminating means for receiving a tag information included in an address supplied by said external device when said memory device is accessed thereby and another tag information of said corresponding tag information read from said memory device in accordance with said address supplied by said external device, said hit discriminating means including means for discriminating a cache-hit status and a cache-miss status on the basis of said tag information and said another tag information;

replacement control means for replacing data stored in said memory device and said corresponding tag information in said memory device when the cache-miss status is discriminated by said hit discriminating means, and replacement limiting means for limiting the replacement of said data stored in said memory device to one time when a plurality of accesses by the external device to the same address are generated and all the plurality of accesses to the same address have said cache-miss status.

2. A cache memory apparatus claimed in claim 1, wherein said memory device includes at least one data memory for storing said portion of data stored in said main memory, said portion of data including a plurality of different portions of data stored in said main memory, said memory device further including at least one tag memory for storing tag information corresponding to the different data portions stored in said at least one data memory, wherein said hit discriminating means includes a first comparator for comparing first tag information included in a first address supplied by said external device with second tag information read out of said tag memory on the basis of said first address, to generate a first hit signal when the first and second tag information are consistent, a second comparator for comparing third tag information included in a second address supplied by a second external device with fourth tag information read out of said tag memory on the basis of said second address, to generate a second hit signal when the third and fourth tag information are consistent, each of said first and second hit signals being applied to said replacement control means, and wherein said replacement limiting means includes a third comparator for comparing said first tag information included in said first address with said third tag information included in said second address and for generating a replacement control signal when said first and third tag information are consistent, said replacement control signal being supplied to said replacement control means so as to inhibit replacement of said data stored in said memory device required as the result of a cache-miss status of the access by said second address.

3. A cache memory apparatus claimed in claim 1, wherein said memory device includes first and second data memories for storing said portion of data stored in said main memory, said portion of data including different portions of data stored in said main memory, said memory device further including first and second tag memories for storing tag information corresponding to the different data portions respectively stored in said first and second data memories, wherein said hit discriminating means includes a first comparator for comparing first tag information included in a first address supplied by said external device with tag information read out of said first tag memory on the basis of said first address, to generate a first hit signal when the first tag information and said tag information read out of said first tag memory are consistent, a second comparator for comparing said first tag information included in said first address with tag information read out of said second tag memory on the basis of said first address, to generate a second hit signal when the first tag information and the tag information read out of said second tag memory are consistent, a third comparator for comparing tag information included in a second address supplied by a second external device with tag information read out of said first tag memory on the basis of said second address, to generate a third hit signal when the tag information included in said second address and said tag information read out of said first tag memory on the basis of said second address are consistent, a fourth comparator for comparing said tag information included in said second address with tag information read out of said second tag memory on the basis of said second given address, to generate a fourth hit signal when the tag information included in said second address and said tag information read of said second tag memory on the basis of said second given address are consistent, a first hit discriminator receiving said first and second hit signals for generating a fifth hit signal which is active when at least one of said first and second hit signals is active and is inactive when both of said first and second hit signals are inactive, and a second hit discriminator receiving said third and fourth hit signals for generating a sixth hit signal which is active when at least one of said third and fourth hit signals is active and is inactive when both of said third and fourth hit signals are inactive, each of said fifth and sixth hit signals being supplied to said replacement control means for replacing data and corresponding tag information in said memory device, and wherein said replacement limiting means includes a fifth comparator for comparing said tag information included in said first address with said tag information included in said second address and for generating a first consistency signal when said tag information included in said first address and said tag information included in said second address are consistent, said first consistency signal being supplied to said replacement control means so as to inhibit replacement of data in said memory device required as the result of a cache-miss status of the access by said second address.

4. A cache memory apparatus claimed in claim 3, wherein each of said first and second addresses includes an index field, and wherein said replacement limiting means further includes a sixth comparator for comparing said index field of said first address with said index field of said second address so as to generate a second consistency signal when said index field of said first address and that of said second address are consistent, and a detector for receiving said first and second consistency signals so as to generate a replacement control signal when both of said first and second consistency signals are active, said replacement control signal being supplied to said replacement control means so as to inhibit replacement of data in said memory device required as the result of a cache-miss status of the access by said second address.

5. A cache memory apparatus claimed in claim 4, further including an access history information storing means for storing a history of accesses to said memory device, and wherein said replacement control means includes means for selecting and replacing one set of data and corresponding tag information in said memory device on the basis of said access history information when the cache-miss status is discriminated by said hit discriminating means, said replacement control means also including means for operating such that when a plurality of accesses having different tag information for an address conflict with each other and at least one of said plurality of accesses has a cache-miss status, updating of said access history information is controlled by said replacement control means.

6. A cache memory apparatus claimed in claim 5, wherein said access history information storing means has a write controller associated therewith and wherein said replacement control means further includes a second detector for receiving said first and second consistency signals and for generating an access history information write control signal when said first consistency signal is active and said second consistency signal is inactive, said access history information write control signal being supplied to said write controller associated with said access history information storing means.

7. A cache memory apparatus to be coupled to a main memory and for being accessed by an external device, comprising:

a memory device having a plurality of ports and including means for being independently accessed through said plurality of ports by said external device, said memory device storing a portion of data stored in said main memory and corresponding tag information indicating memory locations within said main memory of said data portion stored in said memory device;

an access history information storing means for storing a history of accesses to said memory device;

hit discriminating means for receiving first tag information included in an address supplied by said external device when said memory device is accessed thereby and second tag information read from said memory device in accordance with said address supplied by said external device, said hit discriminating means including means for discriminating a cache-hit status and a cache-miss status on the basis of said first and second tag information; and replacement control means for selecting and replacing a portion of said data and said corresponding tag information in said memory device on the basis of said access history information when the cache-miss status is discriminated by said hit discriminating means, said replacement control means including means for operating such that when a plurality of accesses by the external device having different tag information for an address conflict with each other and at least one of said plurality of accesses has a cache-miss status, updating of said access history information is controlled by said replacement control means.

8. A cache memory apparatus as claimed in claim 7, wherein the cache memory apparatus includes means for coupling to a parallel-executing-type processor for parallel-executing a plurality of processings designated by a plurality of fields divided from one instruction, and further including means for notifying said processor that all of a plurality of accesses from said processor have a cache-hit status.

* * * * *